No. 651,745. Patented June 12, 1900.
T. & W. CALDWELL.
METHOD OF MAKING COVERS FOR PNEUMATIC TIRES.
(Application filed Mar. 8, 1900.)

(No Model.)

WITNESSES:
L. C. Hills
John Palmer Wilson

INVENTORS
Thomas Caldwell
William Caldwell
By Wilkinson & Fisher Attorneys

UNITED STATES PATENT OFFICE.

THOMAS CALDWELL, OF BOLTON, AND WILLIAM CALDWELL, OF LEIGH, ENGLAND, ASSIGNORS TO THE RADAX PNEUMATIC TYRE COMPANY, LIMITED, OF WARRINGTON, ENGLAND.

METHOD OF MAKING COVERS FOR PNEUMATIC TIRES.

SPECIFICATION forming part of Letters Patent No. 651,745, dated June 12, 1900.

Original application filed July 18, 1898, Serial No. 686,298. Divided and this application filed March 8, 1900. Serial No. 7,915. (No model.)

*To all whom it may concern:*

Be it known that we, THOMAS CALDWELL, cycle agent, residing at 137 Blackburn road, Bolton, and WILLIAM CALDWELL, cotton-mill manager, residing at Vicarage Square, Leigh, in the county of Lancaster, England, subjects of the Queen of Great Britain, have invented certain new and useful Improvements in Methods of Making Detachable Covers for Pneumatic Tires, of which the following is a specification.

Our invention relates to improvements in the method of manufacturing detachable covers for pneumatic tires.

The object of our invention is to produce a new method of manufacturing detachable covers for pneumatic tires, whereby the said covers when finished are caused to grip the concave rim of the wheel and to be held firmly and securely in position under inflation and pressure of riding without the provision of side wires or thickened edges or ribs to lock with or engage grooves or other specially-provided means upon the rim to coöperate therewith.

Our invention relates particularly to the method ordinarily practiced in producing a tire-cover such as is described and claimed in our application for Letters Patent of the United States filed July 18, 1898, Serial No. 686,298, of which the present application is a division.

In order that our invention may be better understood and carried into practice, reference is had to the accompanying drawings, wherein—

Figure 1:
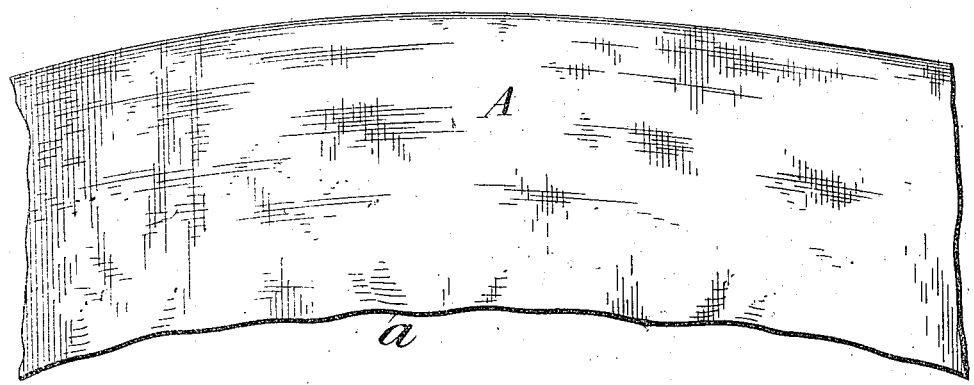
Figure 2:
Figure 3:

Figure 1 is a side view of a short section of the woven fabric used as the basis for the tire-cover before such fabric has been stretched. Fig. 2 is a cross-sectional view on the line 2 2 in Fig. 1, and Fig 3 is a cross-section of the finished tire in position.

In carrying out our invention we first of all employ a woven textile fabric (preferably woven cotton cloth or canvas of sufficient strength and flexibility) formed somewhat V-shaped or U-shaped in cross-section and curved (as to its length) to approximately the radius of the tire to be made, such fabric being woven or produced, for instance, in the manner and by the means set forth in our application for Letters Patent of the United States filed July 18, 1898, Serial No. 686,298. The fabric is stretched in a circular direction, as hereinafter described, in such manner as to almost or entirely deprive the same of its extensibility, and this is done before the fabric is rubbered.

For stretching the fabric we preferably use a circular expanding mandrel or similar apparatus, such as is shown and described in our application for Letters Patent, Serial No. 686,298, or any other suitable means. The fabric is first placed upon the mandrel or other apparatus, which is afterward expanded to the approximate practical limit of extensibility of the fabric thereon, and while in this stretched condition the fabric is preferably moistened with water or other liquid to render the operation of stretching more easily accomplished, the shrinkage consequent upon moistening the fabric being arrested by the mandrel. The stretching operation continues until the extensibility has been permanently removed; or if desired, the fabric may be moistened before being put on the mandrel, in which case the stretching may be as readily accomplished; or the fabric may first be stretched on the expanding mandrel, as above described, and while so stretched subjected to the action of a mercerizing liquid, as aforesaid. In all cases it is the object of this step of the method to take practically all the stretch out of the fabric, and the sufficiency of the stretching or removal of the extensibility of the fabric, by whatever means, may be easily ascertained by testing the edges of the fabric while on the mandrel, the tension of the edges becoming ultimately practically constant.

It is desirable in stretching the fabric for a cover that the operation should be started at such a diameter as shall leave the fabric when fully stretched of the same radius as that of the making-up mandrel, so as to obviate any puckering or slackness. Having thus stretched the fabric to the approximate limit of its extensibility, we lap the stretched fabric once, twice, or more times, according to the character of the cover desired, about a collapsible mandrel and secure the ends of the fabric in any suitable manner. The rubber solution is then applied to the fabric and causes the layers thereof to adhere together and also gives a surface for the outside tread of rubber to adhere to. This outside tread of rubber, if desired, may have projections on it or may be ribbed or corrugated or otherwise suitably formed to prevent side slipping. The coating or rubbering of the fabric while the latter is still held in the stretched condition prevents any shrinkage of the fabric. When the rubber is set upon the fabric, the cover is released and removed from the mandrel and is ready for use. To make a cover, for example, for a twenty-eight-inch wheel, we lap the fabric, which has been woven of the shape aforesaid, on an expanding mandre twenty-six and one-half inches outside diameter and expand the same, with the fabric lapped thereon, to twenty-nine and one-half inches outside diameter. We then take off the stretched fabric from the expanding mandrel and wind it around a collapsible mandrel twenty-seven and three-fourths inches in diameter, so as to allow one-eighth of an inch all around for the rubber coating, thereby making the outside diameter of the finished cover twenty-eight inches.

In the drawings, which illustrate the development of the tire-cover from the unstretched fabric according to our improved method, A represents the fabric composing the basis of the tire cover. (This is shown in Figs. 1 and 2.)

In Fig. 3, where the finished tire is shown, the fabric A is provided with a coating or strip of rubber B, as is usual. D represents the concave rim, and C represents the inner air-tube ordinarily used.

It will be found that the cover A, by reason of its inherent curvature and its longitudinal inextensibility, will hold itself firmly in the concavity of the rim without ribs, rods, wires, or other specially-provided means such as have heretofore usually been employed in tire-covers.

Having now described our invention, what we claim as new, and desire to secure by Letters Patent of the United States, is—

1. The herein-described method of making a cover for a pneumatic tire, which consists in rendering a woven fabric, woven to the curve of the wheel, so far inextensible by stretching in a circular direction that the same when rubbered and made up will form a cover which holds itself securely on the rim under inflation.

2. In the manufacture of detachable covers for pneumatic tires, stretching a curved woven fabric, woven to the radius of the wheel or thereabout, so as to render same so far inextensible that when rubbered and made up into covers these will hold themselves firmly on the rim under inflation without the addition of wires or other holding-on devices.

3. The herein-described method of making detachable covers for pneumatic tires, which consists in rendering a woven fabric, woven to the curve of the wheel, so far inextensible by stretching same in a circular direction until the longitudinal elasticity has been permanently removed from said fabric to such an extent that the latter when rubbered and made up will form a cover which upon inflation will hold itself securely on the rim.

4. In the manufacture of detachable covers for pneumatic tires from a curved woven fabric, woven to the radius of the wheel, the process herein described of stretching such fabric so as to permanently remove the longitudinal elasticity therefrom to such an extent that such stretched fabric when made up into covers for pneumatic tires will under inflation remain on the rim without the addition of any special fastening means.

5. The method of making a detachable cover for pneumatic tires which consists of winding a length of fabric with an inherent curvature approximately the desired curvature of the finished cover and open along its interior circumference—on an expanding mandrel and expanding same till said fabric is rendered practically inextensible longitudinally and making up and rubbering same, substantially as described.

6. The method of making a detachable cover for pneumatic tires, which consists in forming an endless band from a length of woven fabric with an inherent curvature approximately the desired curvature of the finished cover, and open along its interior circumference; treating the band thus formed so as to permanently remove its longitudinal extensibility, and rubbering the same, substantially as described.

7. The method of making a detachable cover for pneumatic tires, which consists in forming an endless band of woven fabric with an inherent curvature approximately the desired curvature of the finished cover, and open along its interior circumference, stretching the said band on a mandrel to the limit of its extensibility, and rubbering the same, substantially as described.

In witness whereof we have hereunto set our hands in presence of two witnesses.

THOMAS CALDWELL.
WILLIAM CALDWELL.

Witnesses:
ERNALD S. MOSELEY,
JOHN W. THOMAS.